(12) United States Patent
Andrews et al.

(10) Patent No.: US 11,209,975 B2
(45) Date of Patent: Dec. 28, 2021

(54) ENHANCED CANVAS ENVIRONMENTS

(71) Applicant: Microsoft Corporation, Redmond, WA (US)

(72) Inventors: Anton Oguzhan Alford Andrews, Seattle, WA (US); Frederick David Jones, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1360 days.

(21) Appl. No.: 13/918,402

(22) Filed: Jun. 14, 2013

(65) Prior Publication Data

US 2014/0250398 A1    Sep. 4, 2014

Related U.S. Application Data

(60) Provisional application No. 61/771,900, filed on Mar. 3, 2013, provisional application No. 61/771,917, filed on Mar. 3, 2013.

(51) Int. Cl.
*G06F 3/0488* (2013.01)
*G06F 3/0481* (2013.01)

(52) U.S. Cl.
CPC ........ *G06F 3/04883* (2013.01); *G06F 3/0481* (2013.01); *G06F 2203/04808* (2013.01)

(58) Field of Classification Search
CPC .... G06F 3/017; G06F 3/04812; G06F 3/0482; G06F 3/04817; G06F 3/04847; G06F 3/0485; G06F 3/0488; G06F 3/04883; G06F 3/0486

USPC ................................. 715/173, 771
See application file for complete search history.

(56) References Cited

U.S. PATENT DOCUMENTS

| | | | |
|---|---|---|---|
| 2008/0094370 A1 | 4/2008 | Ording et al. | |
| 2008/0165141 A1* | 7/2008 | Christie | G06F 3/044 345/173 |
| 2008/0244468 A1* | 10/2008 | Nishihara | G06F 3/017 715/863 |
| 2011/0173574 A1* | 7/2011 | Clavin | G06F 3/017 715/863 |

(Continued)

FOREIGN PATENT DOCUMENTS

| CN | 101611373 A | 12/2009 |
|---|---|---|
| CN | 101667120 A | 3/2010 |

(Continued)

OTHER PUBLICATIONS

Webster's New World Computer Dictionary, 2003, Wiley Publishing, Inc., 10th Edition, p. 318.*

(Continued)

*Primary Examiner* — Pei Yong Weng

(57) ABSTRACT

Systems, methods, and software are disclosed herein for facilitating enhanced canvas presentation environments. In an implementation, a user interacts with a touch-enabled display system capable of displaying items on a canvas. In response to a gesture made by the user with respect to an item being displayed, a format-specific interaction model is identified based on a format associated with the item. A response to the gesture may then be determined using the interaction model and the response rendered for display.

16 Claims, 10 Drawing Sheets

(56) References Cited

U.S. PATENT DOCUMENTS

| | | | |
|---|---|---|---|
| 2011/0179387 A1* | 7/2011 | Shaffer | G06F 3/04883 715/835 |
| 2011/0246875 A1 | 10/2011 | Parker et al. | |
| 2012/0096395 A1 | 4/2012 | Ording et al. | |
| 2013/0027327 A1 | 1/2013 | Chang et al. | |
| 2014/0157209 A1* | 6/2014 | Dalal | G06F 3/017 715/863 |

FOREIGN PATENT DOCUMENTS

| | | | |
|---|---|---|---|
| CN | 101861562 A | 10/2010 | |
| EP | 1942401 A1 | 7/2008 | |
| GB | 2480777 A | 11/2011 | |
| TW | 201234258 A1 | 8/2012 | |

OTHER PUBLICATIONS

"International Search Report & Written Opinion for PCT Patent Application No. PCT/US2014/019177", dated Aug. 1, 2014, Filed Date: Feb. 28, 2014, 9 Pages.

"International Preliminary Report on Patentability Received for PCT Application No. PCT/US2014/019177", dated Jul. 23, 2015, 5 Pages.

Zuiena Kabir, et al.; "Enhanced Interactive Whiteboard Supporting Digital Ink Recognition;" Apr. 11, 2013; pp. 1-7; http://www.zuiena.com/files/IWB_Project_Writeup.pdf.

Jagoda Walny, et al.; "Understanding Pen and Touch Interaction for Data Exploration on Interactive Whiteboards;" In IEEE Transactions on Visualization and Computer Graphics; Dec. 2012; pp. 1-10; vol. 18, No. 1; http://research.microsoft.com/en-US/um/redmond/groups/cue/publications/TVCG2012-SketchInsight.pdf.

Thomas Baudel, et al.; "An Interaction Model Designed for Hand Gesture Input;" Apr. 1994; pp. 1-12; http://citeseerx.ist.psu.edu/viewdoc/download;jsessionid=8EF9DD8D2E85E3341D4231C538CC6816?doi=10.1.1.21.5180&rep=rep1&type=pdf.

"Office Action and Search Report Issued in Taiwan Patent Application No. 103106787", dated Jul. 11, 2017, 5 Pages.

"Office Action and Search Report Issued in Taiwan Patent Application No. 103106787", dated Nov. 16, 2017, 10 Pages.

"Office Action and Search Report Issued in Chinese Patent Application No. 201480012759.X", dated Dec. 25, 2017, 14 Pages.

* cited by examiner

ENHANCED CANVAS ENVIRONMENTS

RELATED APPLICATIONS

This application claims the benefit of and priority to U.S. Provisional Patent Application 61/771,900, entitled ENHANCED CANVAS ENVIRONMENTS, filed on Mar. 3, 2013, as well as U.S. Provisional Patent Application 61/771,917, also entitled ENHANCED CANVAS ENVIRONMENTS and filed on Mar. 3, 2013, both of which are incorporated by reference in their entirety.

TECHNICAL FIELD

Aspects of the disclosure are related to computing hardware and software technology, and in particular, to enhanced digital canvas technology.

TECHNICAL BACKGROUND

Digital white boards serve to provide users with a canvas with which they can interact to create illustrations, take notes, and otherwise work in a way analogous to how non-digital white boards are used. A variety of applications include digital white boards, such as Microsoft® OneNote® and Microsoft® Lync®, on which a user may collect notes, store documents or photos, and otherwise treat as a workspace. Digital pens can be used to generate content, such as drawings and scribbles, which can be saved much like a word processing document or other such productivity item.

Numerous digital white boards also include the ability to embed a variety of different types of items on a canvas. For example, videos, photos, and productivity items can be stored on a canvas alongside other content created with a digital pen. Interacting with any of the items generally requires that an item first be selected or transitioned to an active state by some user input. A user may then interact with the item using controls or gestures specific to the particular item or type of item. Thus, at the canvas level, each item is interacted with in the same way relative to any other items until the item is activated.

How a user is allowed to interact with an item at the canvas level may be considered an interaction model. At the canvas level, interaction with each item is typically governed by the same interaction model for every item. Thus, the same gestures or commands are used to manipulate one item as are used to manipulate any other item, regardless of the item type. Moreover, an item is selected or activated before interaction can begin in accordance with an item-specific interaction model. In other words, for any item that is inactive on a canvas, a user makes an initial or first interaction that selects or activates the item. Once the item is active, the user may make subsequent interactions in accordance with an interaction model for that item.

In one familiar scenario, a canvas may include several embedded objects or items, such as a word processing document, a photo, a video, and text. A user may interact with each item using controls specific to the item type—but only after having activated the item. For example, a word processing document is first brought into focus by touching it before one can manipulate it per its associated interaction model. Likewise, a photo is brought into focus before manipulating it per its interaction model.

In fact, which interaction model is used to interpret gestures or other commands made with respect to a particular item is typically determined after an item is selected or activated. Thus, when an item is selected, its interaction model is loaded and the interaction model can be applied to any subsequent gestures. An item-specific interaction model may be implemented by loading all or portions of an application associated with an active item. For instance, when a word processing items is activated, components of a word processing application are loaded that enable gestures to be interpreted in accordance with an interaction model specific to the word processing document.

OVERVIEW

Provided herein are systems, methods, and software for facilitating enhanced canvas presentation environments. In an implementation, a user interacts with a touch-enabled display system capable of displaying items on a canvas. In response to a gesture made by the user with respect to an item being displayed, a format-specific interaction model is identified based on a format associated with the item. A response to the gesture may then be determined using the interaction model and the response rendered for display. In this manner, different interaction models may be applied items and objects that may vary with respect to their type or format but that share the same active or inactive state.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein provide for enhanced canvas environments within which users may interact in a variety of ways with a variety of content. In particular, a variety of format-specific interaction models are supported for a variety of items having various formats. For example, a user may interact with an item having a first format, in which case an interaction model specific to that format is used when responding to gestures made with respect to that item. A user may also interact with another item having a different format, in which case a different interaction model specific to that different format is used when responded to gestures made with respect to that item.

Moreover, rather than identifying an interaction model with which to interpret a gesture made with respect to an item after the gesture is made, implementations described herein provide for identifying a relevant interaction model for an item after a gesture is made. A gesture may be made with respect to a photo, word processing document, text, or digital handwriting, or any other type of item. In response to the gesture, a model is identified that is specific to the item type or format. The gesture is then interpreted based on the interaction model and a response rendered accordingly.

Enhanced canvas environments may be provided within the context of a note taking application (such as OneNote®) experienced on a laptop, desktop, or tablet computer, as well as a mobile phone, gaming system, or any other suitable computing apparatus. In addition, enhanced canvas environments may be provided by way of enhanced computing systems, such as those having very large touch screens or arrays of touch screens. In some implementations, a large screen may be generally the size of a desk, table, or other workspace with which a user may interact by way of gestures and other interactions.

In some implementations, other equipment may be used to further enhance interactions with content and other items. For example, speech recognition equipment may be employed to capture spoken words such that gestures made with respect to an item on the canvas may be interpreted in view of what was spoken. In another example, motion capture equipment may be employed to capture the motion of a user as a gesture is made to further enhance processing of the gesture. It may be appreciated that these technologies can be used separately or together in an integrated manner. Thus, both speech and motion may be considered when identifying a response to a gesture.

Figure 1:
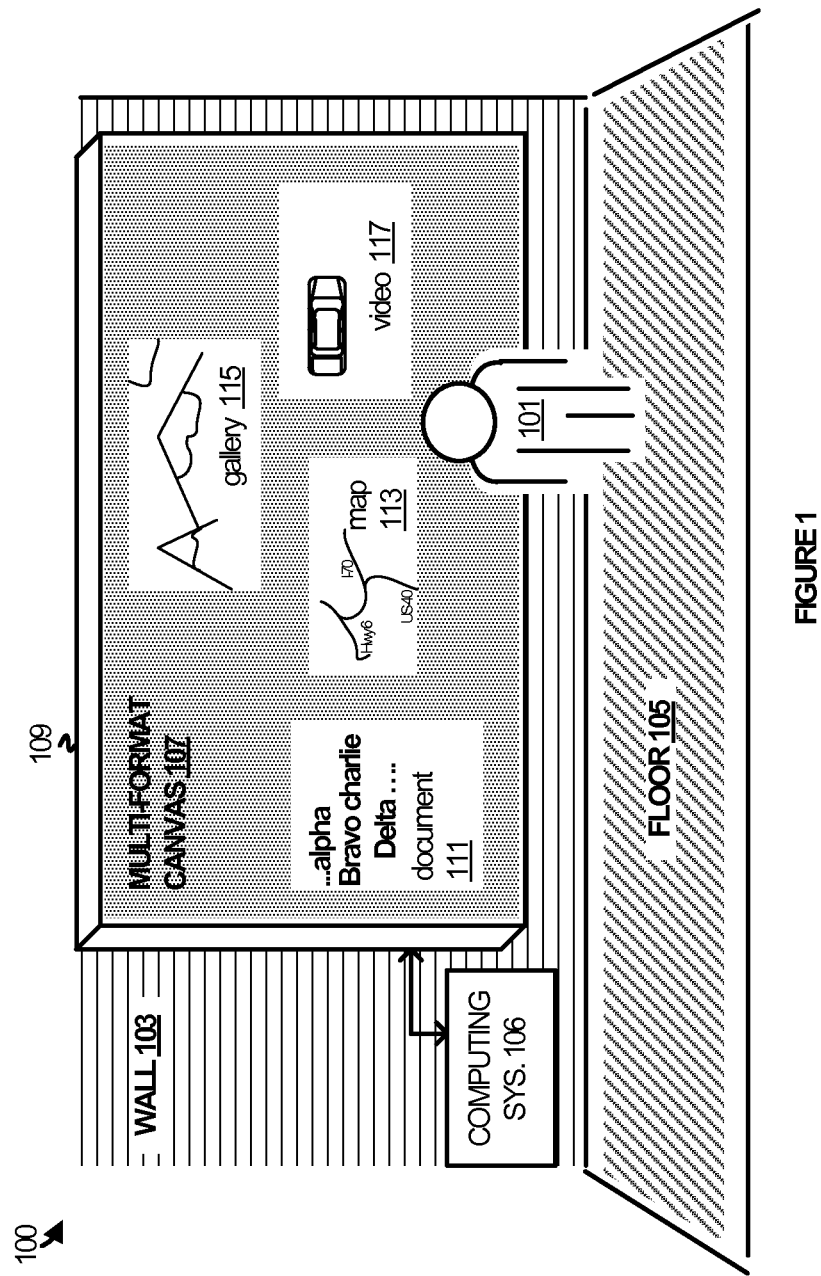
FIG. 1 illustrates an enhanced canvas environment in an implementation.

Referring now to the drawings, FIG. 1 illustrates enhanced canvas environment 100. Enhanced canvas environment 100 includes user 101 located within a space defined at least by a floor 105 and a wall 103, which are merely exemplary to facilitate the present discussion. Computing system 106 drives display system 109, which resides in the space. In some implementations display system 109 may hang on a wall. In other implementations, display system 109 may be arranged or deployed in a table-like or desk-like manner. In yet other implementations, display system 109 may be situated at angle, somewhat like a drafting table or desk.

In operation, user 101 interacts with multi-format canvas 107 displayed by display system 109. In this illustration, multi-format canvas 107 includes various content items, such as a document 111, a map 113, a gallery 115, and a video 117. User 101 may make various gestures with respect to any of the items, responses to which are determined based on an interaction model that is specific to at least one of the items. The various interaction models may have portions in common with each other. In addition, the interaction model for some formats may be the same as the interaction model for other formats. However, at least two formats will have differing interaction models relative to each other.

The varying interaction models allow user 101 to interact with each item differently using gestures that may be the same for each. For example, a swipe gesture to the right made with respect to a video may call up a video timeline that can then be navigated. In contrast, a swipe gesture made to the right with respect to a map may move the focus of the map. In yet another example, a swipe gesture made to the right with respect to a photo may change the photo to a different one sourced from a digital photo gallery.

Figure 2:
FIG. 2 illustrates an enhanced canvas process in an implementation.

The various gestures made by user 101 are captured by display system 109 and gesture information representative of the gestures is communicated to computing system 106. Enhanced canvas process 200, illustrated in FIG. 2, describes a process carried out by computing system 106 when provided with such gesture information. Computing system 106 processes the gesture information to identify an interaction model with which to respond to a gesture (step 201). Upon identifying the interaction model, computing system 106 determines a response to the gesture based on the model (step 203). Computing system 106 then renders the response (step 205) and drives display system 109 to display the response. Various exemplary interaction models and illustrative operational scenarios are described in more detail with respect to FIGS. 3-7 to demonstrate enhanced canvas process 200 in more detail.

Figure 3:
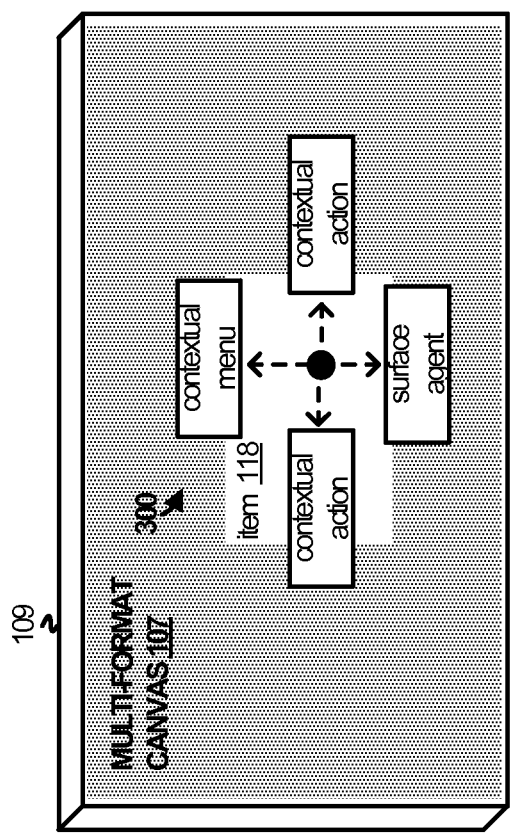
FIG. 3 illustrates an interaction model in an implementation.

FIG. 3 illustrates an interaction model 300 that applies to content items in a specific way for each item based on its format. A touch gesture, represented by the circular symbol in the middle of item 118, may result in one of four actions. A gesture in the upward direction results in the rendering and display of a contextual menu. A gesture in the downward direction results in the surfacing (rendering and display) of an agent that can take various actions, such as making queries on a user's behalf. A swipe left may result in a contextual action specific to a format type for an item, while a swipe right may result in another contextual action specific to a format type for an item. For example, similar swipes may result in different actions for content items having varying formats.

Figure 4:
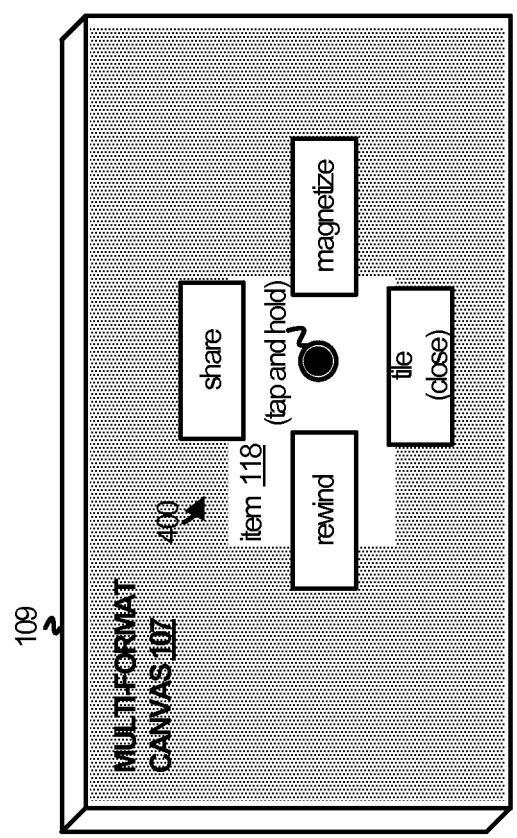
FIG. 4 illustrates an interaction model in an implementation.

FIG. 4 illustrates another interaction model 400 that applies generally to content items in in the same way for each item regardless of its format. In particular, interaction model 400 describes what occurs when a user performs a tap-and-hold gesture on any item. Such a gesture results in the surfacing of four particular options: share, tile, rewind, and magnetize. The share option, when selected, allows a user to share item 118 with others. The rewind option, when selected, allows past actions to be undone. The tile option, when selected, closes the subject item. The magnetize option, when selected, launches a more detailed view or investigation of the subject item.

Figure 5:
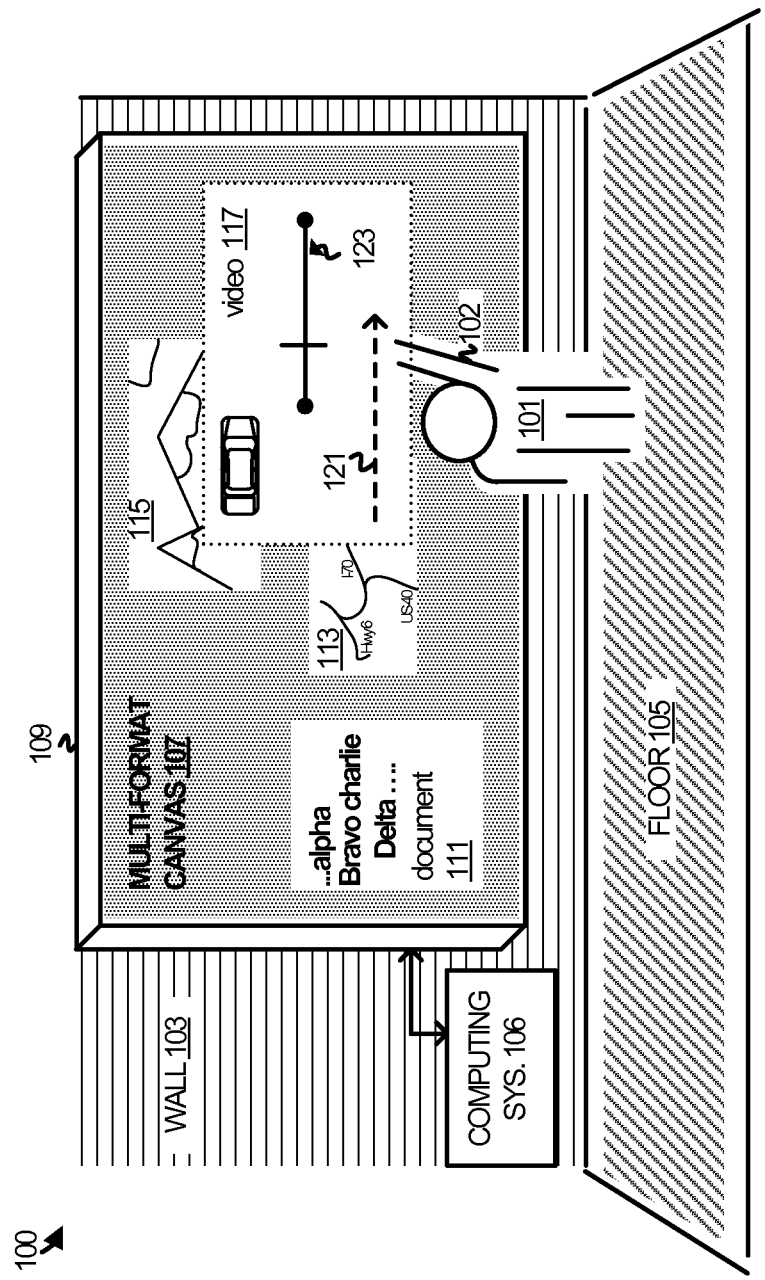
FIG. 5 illustrates an operational scenario in an implementation.
Figure 6:
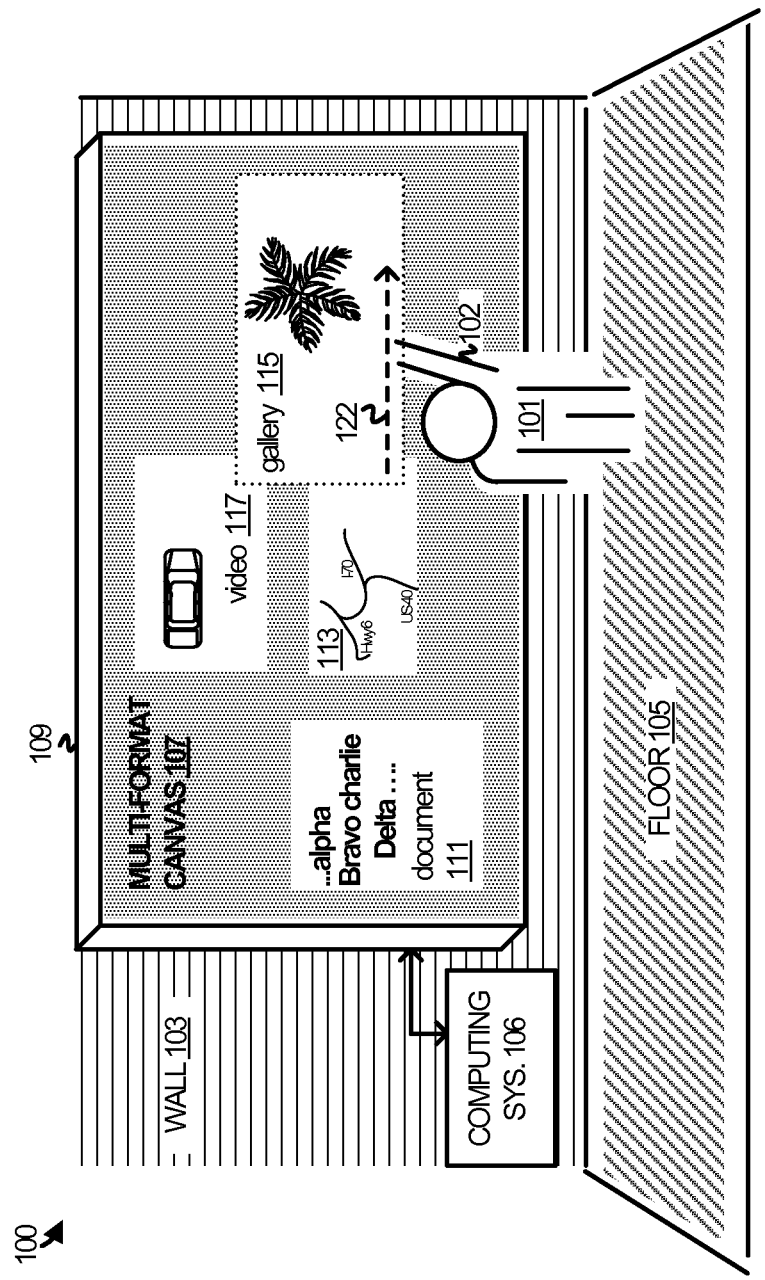
FIG. 6 illustrates an operational scenario in an implementation.

FIG. 5 and FIG. 6 pertain to an operational scenario that illustrates how an interaction model, such as interaction model 300, becomes a specific interaction model when applied with respect to a specific item. In FIG. 5 user 101 makes a swipe gesture 121 to the right with his arm 102 extended. Swipe gesture 121 is made with respect to video 117. The rightward swipe results in a time bar 123 surfacing overlaid onto video 117. User 101 may then navigate to various parts in video 117 by touching the time bar 123. Alternatively, a sideways swipe at any point on the video results in a scrubbing action where the video is advanced or rewound proportional to the distance that the user swiped. An upwards or downwards swipe results in the volume of the video being adjusted up or down proportional to the distance that the user swiped. This can be achieved while displaying a control surface such as a video scrubbing interface or volume control while the swipe is occurring, or it can be achieved without showing any additional user interface and simply performing scrubbing or volume adjustment.

Referring now to FIG. 6, user 101 has made another swipe gesture 122, again in the rightward direction. However, in this situation a new photo has replaced the photo initially shown within gallery 115 in FIG. 5, representing that swipe gesture 122 triggers a scroll feature through gallery 115. This is because the content item subject to swipe gesture 122—a photo—is a different type of item than the video subject to swipe gesture 121. Thus, a different interaction model was used to determine and render the response to swipe gesture 122 than was used with respect to swipe gesture 121. Some gestures may achieve the same result in multiple formats when those formats would both benefit from the same gesture, such as a pinch gesture, that result in a zoom in both mapping content and photo content.

Figure 7:
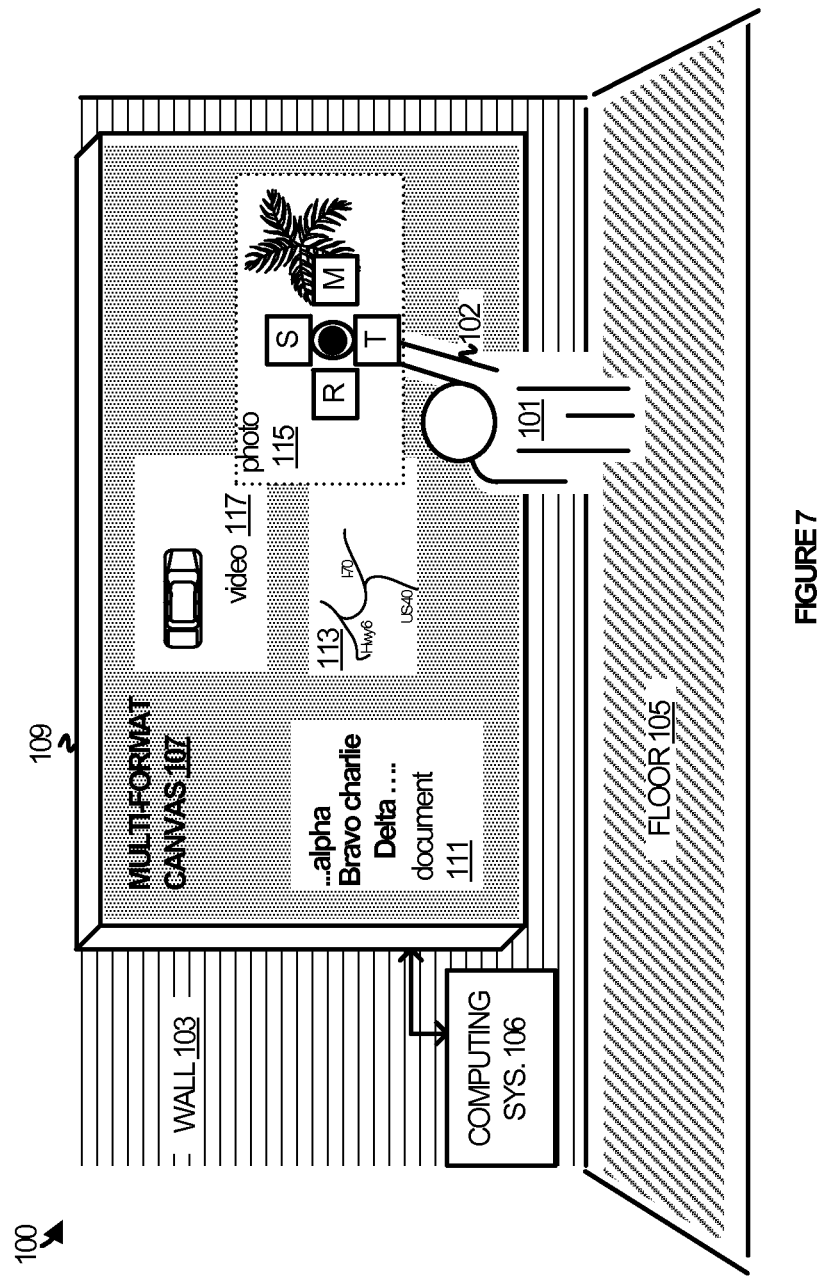
FIG. 7 illustrates an operational scenario in an implementation.

FIG. 7 illustrates an operational scenario involving a tap-and-hold gesture. In FIG. 7, user 101 extends his arm 102 and makes a tap-and-hold gesture with respect to the photo in gallery 115. The tap-and-hold gesture triggers surfacing of four options overlaid onto the photo in gallery 115. The four options correspond to the interaction model discussed with respect to FIG. 4, namely the share, magnetize, rewind, and tile options. User 101 may next select any of the options or may proceed to other interactions.

Figure 9:
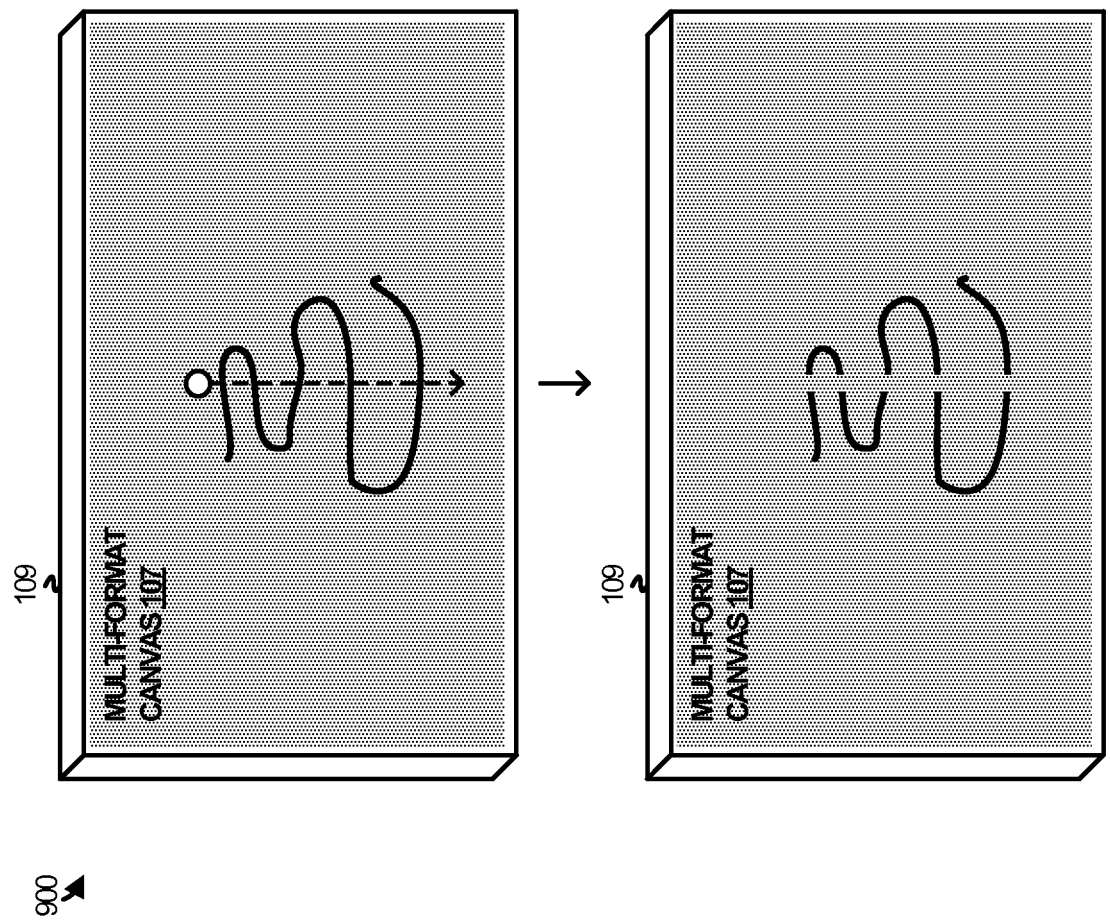
FIG. 9 illustrates an interaction model in an implementation.
Figure 10:
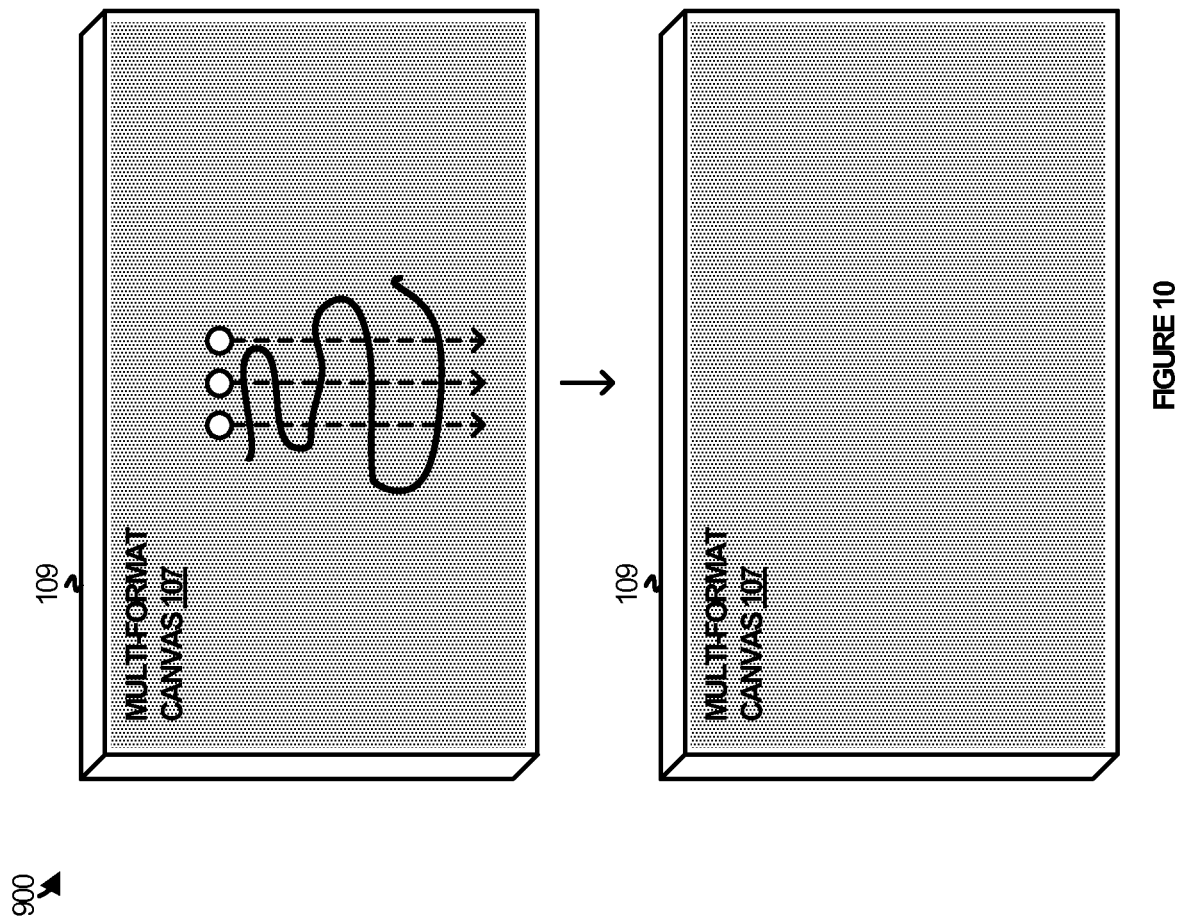
FIG. 10 illustrates an interaction model in an implementation.

FIG. 9 and FIG. 10 illustrate another interaction model 900. Interaction model 900 describes how a user may interact with a free-form drawing or other types of drawings that may be made on multi-format canvas 107 to erase all or parts of the drawing. In this scenario, a user has created a drawing using some suitable drawing mechanism such as a pen or stylus used to draw on the display. A single touch interaction that proceeds down through the drawing results in a corresponding erasure of portions of the drawing. This single touch interaction is similar to the traditional non-digital whiteboard action of drawing with a traditional ink erasable marker, and then using a finger to selectively wipe portions of the drawing away, such as small line segments within a shape, line, or curve. In contrast, a multi-touch interaction that proceeds in a downward motion over the drawing results in complete erasure of the shapes or lines that the motion intersects. This multi-touch interaction is similar to wiping a traditional whiteboard with the flat of the hand or with an eraser. These gestures can be distinguished by the detection of a single finger for the single touch interaction versus detection of multiple fingers accomplishing the touch interaction. The gestures can be done in any direction or path and need not be linear or aligned to any particular axis. In this manner, smaller or larger portions of a drawing can be erased in a manner similar to those used in a traditional erasable ink based whiteboard.

Various aspects may be appreciated from the foregoing discussion. In at least one implementation, multi-format canvas interactions can be accepted by a relatively large screen touch/pen display user interface that makes content primary and control surfaces hidden until accessed. Three gestures and four actions may be supported in some scenarios. Content may be surfaced without any border, chrome, or other adornment. When a user wishes to interact, natural gestures like pinch to zoom trigger rendering of a response to the pinch to zoom. The multi-format canvas can thus have multiple content types present and active within the canvas without the need to display controls such as buttons or sliders associated with that content.

Additionally, gestures in the multi-format canvas may enable input via voice command. For instance a multi-finger tap and hold gesture may indicate that voice commands or content are to be directed to this content. Speech directed to a specific area of the user interface may then be processed in a manner that is different than speech that is merely directed to the computing system as a whole. For instance, speech directed to a particular piece of video content can be processed using a grammar that contains only commands for video, such as "fast forward", or the grammar may be altered to make commands that are related to video be selected as matching commands at a higher frequency. The content of the particular content that is selected may also be used to adjust the interpretation of the speech presented. The speech may also be interpreted in light of the context of the touch, such as by recognizing that a command to "print this picture" refers to the picture that is touched rather than other pictures that may be displayed at this time. Additionally, if a piece of content, such as an instant message conversation is selected, speech may be directed to the remote instant message user as a voice conversation rather than being interpreted locally as a command.

In at least one implementation, three universal gestures may be recognized. First, a flick-up gesture launches a contextual menu that is specific to the content that is the subject of the gesture. For example, a flick-up focused on text may surface Bing-searched data, other controls, or other meta-data discovered information. A second gesture, flick down, may launch a voice-controlled agent for natural language queries that knows about the context of the piece of content. For instance, when watching a video, a flick down that occurs with a spoken query "when is the next showing of this?" may launch the agent. The agent would import the context about what movie is being displayed and would know to search and display results for only that movie. Or a user may signify a more particular piece of the content such as circling part of an engineering drawing and ask "Find me a sensor that will fit in here." By circling the piece and performing the flick down gesture, the agent will be summoned and will incorporate the spoken query when searching for sensors. A more detailed discussion of multi-format canvas is provided in Appendix A and Appendix B.

Tapping and holding content may result in four fundamental actions: share, tile, rewind, and magnetic. With share, content may be shared in a variety of ways, such as through email, sharing services, micro-blogs, or the like. Tiling closes a content item. Rewind allows for undoing of past behavior, while magnetize results in a contextual search that can surface related people, content, actions, or data. For example, a contextual search may identify when an expert related to a scientific study is present in the user's organization, and present a communication user interface element to allow contacting the expert to obtain advice. The magnetize function can also summarize results in a particular area such as by showing how often a topic is covered in literature, etc.

Figure 8:
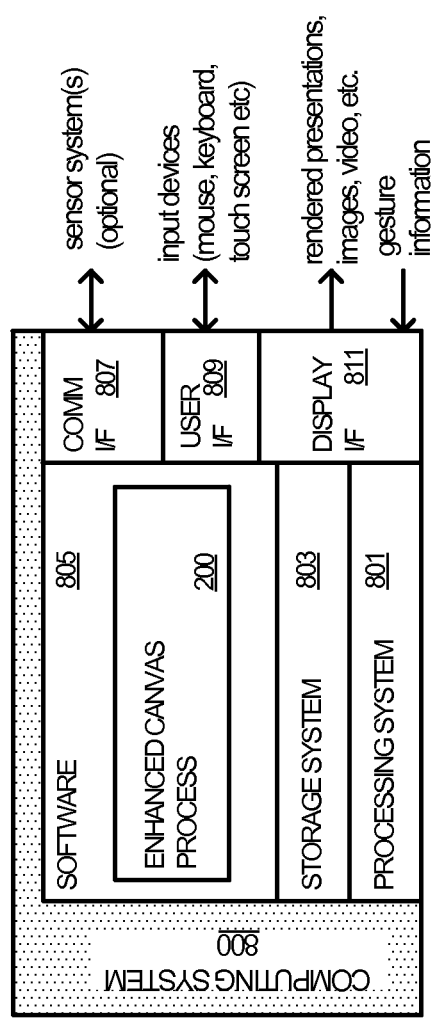
FIG. 8 illustrates a computing system in an implementation.

FIG. 8 illustrates computing system 800, which is representative of any computing apparatus, system, or collection of systems suitable for implementing computing system 106 illustrated in FIG. 1. Examples of computing system 800 include general purpose computers, desktop computers, laptop computers, tablet computers, work stations, virtual computers, or any other type of suitable computing system, combinations of systems, or variations thereof.

Computing system 800 includes processing system 801, storage system 803, software 805, communication interface 807, user interface 809, and display interface 811. Computing system 800 may optionally include additional devices, features, or functionality not discussed here for purposes of brevity. For example, computing system 106 may in some scenarios include integrated sensor equipment, devices, and functionality, such as when a computing system is integrated with a sensor system.

Processing system 801 is operatively coupled with storage system 803, communication interface 807, user interface 809, and display interface 811. Processing system 801 loads and executes software 805 from storage system 803. When executed by computing system 800 in general, and processing system 801 in particular, software 805 directs computing system 800 to operate as described herein for enhanced canvas process 200, as well as any variations thereof or other functionality described herein.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable storage media readable by processing system 801 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 803 may also include communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 801.

Software 805 may be implemented in program instructions and among other functions may, when executed by computing system 800 in general or processing system 801 in particular, direct computing system 800 or processing system 801 to operate as described herein for enhanced canvas process 200. Software 805 may include additional processes, programs, or components, such as operating system software or other application software. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate enhanced presentation environments as described herein for each implementation. Indeed, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-storage media are characterized as primary or secondary storage.

For example, if the computer-storage media are implemented as semiconductor-based memory, software 805 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It may be understood that computing system 800 is generally intended to represent a computing system with which software 805 is deployed and executed in order to implement enhanced canvas process 200 (and variations thereof). However, computing system 800 may also represent any computing system on which software 805 may be staged and from where software 805 may be distributed, transported, downloaded, or otherwise provided to yet another computing system for deployment and execution, or yet additional distribution.

Referring again to the various implementations described above, through the operation of computing system 800 employing software 805, transformations may be performed with respect to enhanced canvas environment 100. As an example, an item may be rendered and displayed on display system 109 in one state. Upon user 101 interacting with multi-format canvas 107 in a particular manner, such by making a touch gesture, computing system 106 (in communication with display system 109) may render a response to the gesture for display by display system 109 thereby transforming multi-format canvas 107 to a second, different state.

Referring again to FIG. 8, communication interface 807 may include communication connections and devices that allow for communication between computing system 800 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 809, which is optional, may include a mouse, a keyboard, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 809. The aforementioned user interface components are well known and need not be discussed at length here.

Display interface 811 may include various connections and devices that allow for communication between computing system 800 and a display system over a communication link or collection of links or the air. For example, computing system 106 may communicate with display system 109 by way of a display interface. Examples of connections and devices that together allow for inter-system communication may include various display ports, graphics cards, display cabling and connections, and other circuitry. Display interface 811 communicates rendered responses to a display system for display, such as video and other images. In some implementations the display system may be capable of accepting user input in the form of touch gestures, in which case display interface 811 may also be capable of receiving information corresponding to such gestures. The aforementioned connections and devices are well known and need not be discussed at length here.

It may be appreciated from the discussion above that, in at least one implementation, a suitable computing system may execute software to facilitate enhanced canvas environments. When executing the software, the computing system may be directed to, in response to a gesture associated with an item displayed on a display surface, identify an interaction model specific to a format of the item. The computing system may then identify a response to the gesture in accordance with the interaction model and render the response with respect to the item on the display surface.

In order to identify the interaction model, the computing system may identify the format of the item and select the interaction model from a various interaction modules associated with various formats. In some scenarios the format of the item is one of the various formats.

The computing system may render a various items on the display surface. Each of the items may have an active status the same as every other item. In some scenarios the items may be rendered within the context of a user interface. The user interface can be considered to include a foreground and a background. Thus, the active status may indicate whether each of the items is active in the foreground or the background of the user interface.

Each of the plurality of interaction models may define various directional gestures as corresponding to various responses (from which to identify the response). In some implementations, at least some of the responses are unique to each of the interaction models, while at least some others are shared in common across each of the interaction models. Examples of the directional gestures may include a right swipe gesture, a left swipe gesture, an up swipe gesture, and a down swipe gesture. A first portion of the responses may correspond to the right swipe gesture and the left swipe gesture while a second portion of the responses may correspond to the up swipe gesture and the down swipe gesture.

In at least one implementation, the computing system may render a drawing on a user interface comprising a multi-format canvas. In response to a single touch interaction that proceeds through the drawing, the computing system may render an erasure of only a portion of the drawing. In response to a multi-touch interaction that proceeds through the drawing, the computing system may render an erasure of an entirety of the drawing. An example of the single touch interaction includes dragging a single digit down through the drawing. An example of the multi-touch interaction includes dragging at least three digits down through the drawing. The erasure of only the portion of the drawing may include an erased vertical strip through the drawing corresponding to a path through the drawing created by the single touch interaction.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more computer readable storage media; and
   program instructions stored on the one or more computer readable storage media that, when executed by a processing system, direct the processing system to at least:
   render a plurality of items in an active state on a display surface, wherein each of the plurality of items has a different format and a different interaction model than at least one other of the plurality of items;
   receive a touch gesture associated with an item of the plurality of items displayed on the display surface;
   in response to the touch gesture, identify an interaction model specific to a format of the item, wherein the interaction model interprets the touch gesture differently relative to one or more interaction models of one or more of the plurality of items;
   identify a response to the touch gesture in accordance with the interaction model; and
   render the response with respect to the item on the display surface.

2. The apparatus of claim 1 wherein to identify the interaction model, the program instructions direct the processing system to identify the format of the item and select the interaction model from a plurality of interaction modules associated with a plurality of formats, wherein the format comprises a one of the plurality of formats.

3. The apparatus of claim 2 wherein the plurality of formats comprises a productivity item format.

4. The apparatus of claim 1 wherein the program instructions further direct the processing system to render a user interface in which to display the plurality of items, wherein the user interface comprises a foreground and a background, and wherein the active state indicates whether each of the plurality of items is active in the foreground or the background of the user interface.

5. The apparatus of claim 2 wherein each of the plurality of interaction models defines a plurality of directional gestures as corresponding to a plurality of responses from which to identify the response, wherein at least a first portion of the plurality of responses are unique to each of the plurality of interaction models and wherein at least a second portion of the plurality of responses is shared in common with respect to each of the plurality of interaction models.

6. The apparatus of claim 5 wherein the plurality of directional gestures comprises a right swipe gesture, a left swipe gesture, an up swipe gesture, and a down swipe gesture.

7. The apparatus of claim 6 wherein the first portion of the plurality of responses corresponds to the right swipe gesture and the left swipe gesture and wherein the second portion of the plurality of responses corresponds to the up swipe gesture and the down swipe gesture.

8. The apparatus of claim 1 further comprising a display system configured to accept the gesture by way of a touch interface and display the response to the gesture and the processing system configured to execute the program instructions.

9. A method for facilitating enhanced canvas environments comprising:
   rendering a plurality of items in an active state on a display surface, wherein each of the plurality of items has a different format than at least one other of the plurality of items;
   receiving a gesture associated with an item of the plurality of items displayed on the display surface;
   in response to the gesture, identifying an interaction model specific to a format of the item, wherein the interaction model interprets the gesture differently relative to one or more interaction models of one or more of the plurality of items;
   identifying a response to the gesture in accordance with the interaction model; and
   rendering the response with respect to the item on the display surface.

10. The method of claim 9 wherein identifying the interaction model comprises identifying the format of the item and selecting the interaction model from a plurality of interaction modules associated with a plurality of formats, wherein the format comprises a one of the plurality of formats.

11. The method of claim 10 wherein the plurality of formats comprises a productivity item format.

12. The method of claim 9 further comprising rendering a user interface in which to display the plurality of items, wherein the user interface comprises a foreground and a background, and wherein the active state indicates whether each of the plurality of items is active in the foreground or the background of the user interface.

13. The method of claim 10 wherein each of the plurality of interaction models defines a plurality of directional gestures as corresponding to a plurality of responses from which to identify the response, wherein at least a first portion of the plurality of responses are unique to each of the plurality of interaction models and wherein at least a second portion of the plurality of responses is shared in common with respect to each of the plurality of interaction models.

14. The method of claim 13 wherein the plurality of directional gestures comprises a right swipe gesture, a left swipe gesture, an up swipe gesture, and a down swipe gesture.

15. The method of claim 14 wherein the first portion of the plurality of responses corresponds to the right swipe gesture and the left swipe gesture and wherein the second portion of the plurality of responses corresponds to the up swipe gesture and the down swipe gesture.

16. The method of claim 9 further comprising, in a display system, accepting the gesture by way of a touch interface and displaying the response to the gesture.

\* \* \* \* \*